United States Patent
Chen et al.

(10) Patent No.: US 12,092,926 B2
(45) Date of Patent: Sep. 17, 2024

(54) BACKLIGHT MODULE AND DISPLAY DEVICE

(71) Applicant: HUIZHOU CHINA STAR OPTOELECTRONICS DISPLAY CO., LTD., Guangdong (CN)

(72) Inventors: Dongzi Chen, Guangdong (CN); Jiao Wang, Guangdong (CN)

(73) Assignee: HUIZHOU CHINA STAR OPTOELECTRONICS DISPLAY CO., LTD., Guangdong (CN)

( * ) Notice: Subject to any disclaimer, the term of this patent is extended or adjusted under 35 U.S.C. 154(b) by 0 days.

(21) Appl. No.: 17/620,728

(22) PCT Filed: Dec. 13, 2021

(86) PCT No.: PCT/CN2021/137347
§ 371 (c)(1),
(2) Date: Dec. 19, 2021

(87) PCT Pub. No.: WO2023/097758
PCT Pub. Date: Jun. 8, 2023

(65) Prior Publication Data
US 2024/0027833 A1    Jan. 25, 2024

(30) Foreign Application Priority Data
Dec. 2, 2021 (CN) .......................... 202111459703.7

(51) Int. Cl.
*G02F 1/13357* (2006.01)
*G02F 1/1333* (2006.01)

(52) U.S. Cl.
CPC .... *G02F 1/133611* (2013.01); *G02F 1/13336* (2013.01); *G02F 1/133603* (2013.01); *G02F 1/133606* (2013.01)

(58) Field of Classification Search
CPC ......... G02F 1/133611; G02F 1/133603; G02F 1/133606; G02F 1/13336; F21V 5/04
See application file for complete search history.

(56) References Cited

U.S. PATENT DOCUMENTS

| | | | |
|---|---|---|---|
| 6,341,879 B1 | 1/2002 | Skinner et al. | |
| 2015/0138755 A1* | 5/2015 | Bastani | G09F 13/04 362/97.1 |

(Continued)

FOREIGN PATENT DOCUMENTS

| | | |
|---|---|---|
| CN | 109358453 A | 2/2019 |
| CN | 210294751 U | 4/2020 |

(Continued)

OTHER PUBLICATIONS

Chinese Office Action issued in corresponding Chinese Patent Application No. 202111459703.7 dated Apr. 19, 2023, pp. 1-7.

(Continued)

*Primary Examiner* — Erin Kryukova
(74) *Attorney, Agent, or Firm* — PV IP PC; Wei Te Chung

(57) ABSTRACT

The present invention discloses a backlight module and a display device adopting the backlight module. The backlight module is composed of a plurality of backlight panels spliced with each other; wherein the backlight panel includes: a plurality of first light-emitting unit arranged in the body area; and a plurality of second light-emitting units arranged in the splicing area, wherein the plurality of first light-emitting units and the plurality of second light-emitting units are arranged in a matrix, and under a same area, a brightness of the body area is lower than a brightness of the splicing area.

14 Claims, 3 Drawing Sheets

(56) References Cited

U.S. PATENT DOCUMENTS

| | | | | |
|---|---|---|---|---|
| 2017/0031210 A1* | 2/2017 | Kim | ................... | G02B 19/0071 |
| 2018/0130425 A1* | 5/2018 | Choi | ....................... | G09G 3/342 |
| 2018/0252965 A1* | 9/2018 | Zheng | ............... | G02F 1/133608 |
| 2021/0123581 A1* | 4/2021 | Kaneko | ............. | G02F 1/133603 |

FOREIGN PATENT DOCUMENTS

| | | | | |
|---|---|---|---|---|
| CN | 210403725 U | | 4/2020 | |
| CN | 111208673 A | | 5/2020 | |
| CN | 112002217 A | | 11/2020 | |
| CN | 112068351 A | | 12/2020 | |
| CN | 112230475 A | | 1/2021 | |
| CN | 212460264 U | | 2/2021 | |
| CN | 113311619 A | * | 8/2021 | ......... G02F 1/13336 |
| CN | 214098031 U | | 8/2021 | |
| EP | 3438964 A1 | * | 2/2019 | ......... G02F 1/13336 |
| KR | 20140095858 A | * | 8/2014 | |
| KR | 101771557 B1 | * | 8/2017 | |

OTHER PUBLICATIONS

International Search Report in International application No. PCT/CN2021/137347,mailed on Apr. 26, 2022.
Written Opinion of the International Search Authority in International application No. PCT/CN2021/137347,mailed on Apr. 26, 2022.

* cited by examiner

BACKLIGHT MODULE AND DISPLAY DEVICE

BACKGROUND OF INVENTION

Field of Invention

The present invention relates to a field of display technology, in particular to a backlight module with uniform visual brightness.

Description of Prior Art

Backlight in an existing large-sized liquid-crystal display (LCD) is generally formed by splicing a plurality of the backlight panels, and dark shadows are likely to appear at joints (i.e., splicing seams) of adjacent backlight panels, leading to uneven brightness of backlight panels at the panel body area and the splicing area, which is due to reduced brightness of the backlight panel caused by misalignment, uneven splicing seam line, or reduced reflectivity. In order to improve the dark shadow phenomenon in the splicing area of the backlight panels, known methods include reducing a distance of a light-emitting unit (such as small lamp beads) on the backlight panel from an edge of the backlight panel, optimizing the design of the splicing seams, adding a reflective sheet at the splicing area, and so on. However, the above methods have their own shortcomings: reducing the distances between the lamp beads and the edges is limited by the limited range of reduction, so that, as a designed pitch of the light-emitting units decreases to be closer to a critical value, an effect of alleviating the dark shadow cannot be further improved; modifying the design of the splicing seams increases complexity of productions of the backlight panel and the module; and attaching a reflective sheet at the splicing area will increase a thickness in the splicing area, and have a certain shielding effect on light-emitting units above and adjacent to the reflective sheet, and the thinner the thicknesses of the light-emitting units (such as flip-chips of about 100 um) are, the greater the impact is.

Therefore, there is an urgent need for a backlight module with backlight panels which have brightness tending to be visually uniform in the body area and the splicing area.

SUMMARY OF INVENTION

The present invention provides a backlight module and a display device adopting the backlight module. By reducing an output brightness of an area (body area) other than the splicing area of the backlight panels, a dark shadow phenomenon in the splicing area of the backlight panels is improved, and the backlight panels having brightness tending to be visually uniform in the body area and the splicing area, thereby achieving the effect of enhancing the viewing taste.

In a first aspect, an embodiment of the present invention provides a backlight module, composed of a plurality of backlight panels spliced with each other, each of the plurality of backlight panels including a body area and a splicing area located on a periphery of the body area, the splicing area being defined as an area adjacent to splicing seams between adjacent ones of the plurality of backlight panels; wherein the backlight panel includes:
a plurality of first light-emitting units, the plurality of first light-emitting units being arranged in the body area; and
a plurality of second light-emitting units, wherein the plurality of second light-emitting units being arranged in the splicing area,
wherein the plurality of first light-emitting units and the plurality of second light-emitting units are arranged in a matrix, and under a same area, a brightness of the body area is lower than a brightness of the splicing area.

In an embodiment of the present invention, a brightness of each of the first light-emitting units is lower than 0.1%-20% of a brightness of each of the second light-emitting units.

In an embodiment of the present invention, the backlight module further includes a light-absorbing material, and the light-absorbing material is disposed in the body area.

In an embodiment of the present invention, the backlight module further includes a plurality of lenses, the plurality of lenses cover the plurality of first light-emitting units in a one-to-one correspondence, and the light-absorbing material is dispersed in each of the lenses.

In an embodiment of the present invention, the backlight module further includes an encapsulating glue covering the plurality of first light-emitting units, wherein the light-absorbing material is dispersed in the encapsulating glue.

In an embodiment of the present invention, the light-absorbing material is present in an amount of 0.01%-50% by weight of each of the lenses or an encapsulating glue.

In an embodiment of the present invention, the light-absorbing material is selected from one or more of carbon powder, toner, graphene, and matte powder.

In an embodiment of the present invention, the plurality of second light-emitting units are arranged in at least one row along the splicing area in an extension direction of the splicing seams.

In an embodiment of the present invention, the plurality of second light-emitting units are arranged in a plurality of rows along the splicing area in an extension direction of the splicing seams.

In a second aspect, another embodiment of the present invention also provides a display device, the display device includes a backlight module, the backlight module is composed of a plurality of backlight panels spliced with each other, each of the plurality of backlight panels including a body area and a splicing area located on a periphery of the body area, the splicing area being defined as an area adjacent to splicing seams between adjacent ones of the plurality of backlight panels; wherein the backlight panel includes:
a plurality of first light-emitting units, the plurality of first light-emitting units being arranged in the body area; and
a plurality of second light-emitting units, wherein the plurality of second light-emitting units being arranged in the splicing area,
wherein the plurality of first light-emitting units and the plurality of second light-emitting units are arranged in a matrix, and under a same area, a brightness of the body area is lower than a brightness of the splicing area.

In the display device of the present invention, a brightness of each of the first light-emitting units is lower than 0.1%-20% of a brightness of each of the second light-emitting units.

In the display device of the present invention, a brightness of each of the first light-emitting units is lower than 1%-5% of a brightness of each of the second light-emitting units.

In the display device of the present invention, the backlight module further includes a light-absorbing material, and the light-absorbing material is disposed in the body area.

In the display device of the present invention, the backlight module further includes a plurality of lenses, the plurality of lenses cover the plurality of first light-emitting units in a one-to-one correspondence, and the light-absorbing material is dispersed in each of the lenses.

In the display device of the present invention, the backlight module further includes an encapsulating glue covering the plurality of first light-emitting units, wherein the light-absorbing material is dispersed in the encapsulating glue.

In the display device of the present invention, the light-absorbing material is present in an amount of 0.01%-50% by weight of each of the lenses.

In the display device of the present invention, the light-absorbing material is present in an amount of 0.01%-50% by weight of the encapsulating glue.

In the display device of the present invention, the light-absorbing material is selected from one or more of carbon powder, toner, graphene, and matte powder.

In the display device of the present invention, the plurality of second light-emitting units are arranged in at least one row along the splicing area in an extension direction of the splicing seams.

In the display device of the present invention, the plurality of second light-emitting units are arranged in a plurality of rows along the splicing area in an extension direction of the splicing seams.

In the backlight module and the display device adopting the backlight module provided by the present invention, the distance between an edge of backlight panels and light-emitting units (such as small lamp beads) on the backlight panels is not limited by the problem that the distance from the edge cannot be reduced indefinitely, and therefore an effect of alleviating dark shadows can be further improved without increasing complexity of structures and a manufacturing process of the backlight panels, and without shielding the light-emitting units. Rather, in the backlight module and the display device adopting the backlight module provided by the present invention, only by adding a small amount of material and production cost (selecting light-emitting units with different brightness and/or adding a light-absorbing material), the uneven brightness between two areas, a backlight panel body area and a splicing area, can be improved, thus ensuring a good display effect. Accordingly, in the backlight module and the display device adopting the backlight module provided by the present invention, by reducing an output brightness of an area (body area) other than the splicing area of the backlight panels, a dark shadow phenomenon in the splicing area of the backlight panels is improved, and the backlight panels having brightness tending to be visually uniform in the body area and the splicing area, thereby achieving the effect of enhancing the viewing taste.

Other features and advantages of the present invention will be described in the following description, and partly become obvious from the description, or understood by implementing the present invention. The object and other advantages of the present invention can be realized and obtained through the structures specifically pointed out in the specification, claims and drawings.

BRIEF DESCRIPTION OF DRAWINGS

In order to more clearly illustrate the technical solutions of the embodiments of the application, the drawings illustrating the embodiments will be briefly described below.

DETAILED DESCRIPTION OF PREFERRED EMBODIMENTS

The implementation of the present invention will be described in detail below with reference to the accompanying drawings and embodiments, so as to fully understand how the present invention applies technical means to solve technical problems and achieve the realization process of technical effects and implement them accordingly. It should be noted that, as long as there is no conflict, embodiments of the present invention and features in each embodiment can be combined with each other, and the technical solutions obtained are all within the protection scope of the present invention.

Meanwhile, in the following description, many specific details are set forth for the purpose of explanation to provide a thorough understanding of the embodiments of the present invention. However, it is obvious to those skilled in the art that the present invention can be implemented without the specific details of the embodiments or the specific manners described.

The present invention provides a backlight module and a display device adopting the backlight module. By reducing an output brightness of an area (body area) other than the splicing area of the backlight panels, a dark shadow phenomenon in the splicing area of the backlight panels is improved, and the backlight panels having brightness tending to be visually uniform in the body area and the splicing area, thereby achieving the effect of enhancing the viewing taste.

Figure 1:
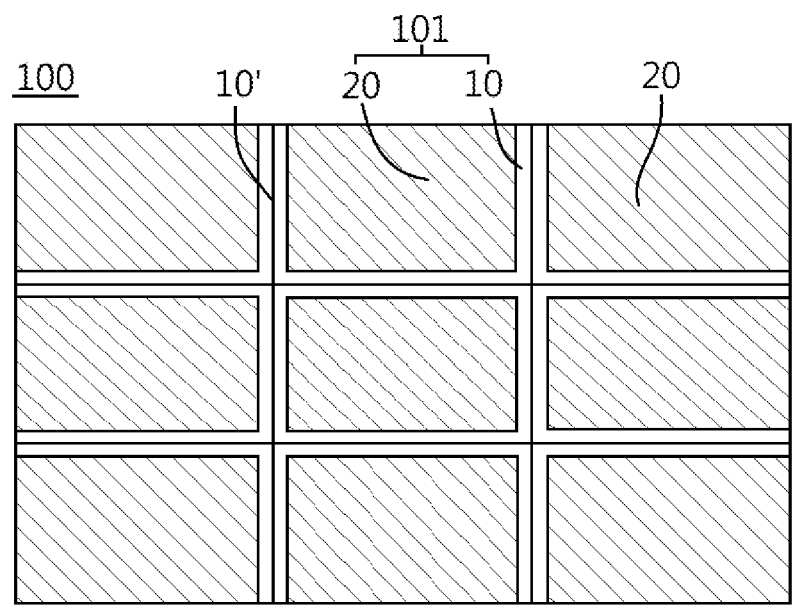
FIG. 1 is a schematic top view of a backlight module according to an embodiment of the present invention.
Figure 2:
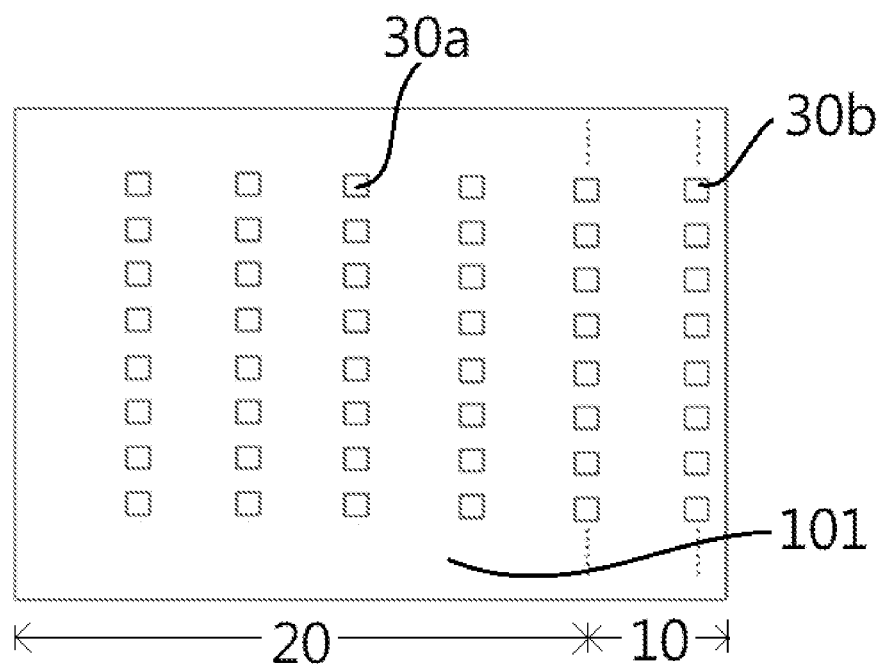
FIG. 2 is a schematic top view of a part of a backlight panel according to an embodiment of the present invention.

Referring to FIG. 1, FIG. 1 is a schematic top view of a backlight module according to an embodiment of the present invention. As shown in FIG. 1, in order to achieve the above object, an embodiment of the present invention provides a backlight module 100, such as a direct-lit backlight (including mini LEDs) module, which is composed of a plurality of backlight panels 101 spliced with each other, each of the plurality of backlight panels 101 including a body area 20 and a splicing area 10 located on a periphery of the body area 20, and the splicing area 10 is defined as an area adjacent to splicing seams 10' between adjacent ones of the plurality of backlight panels 101. Referring to FIG. 2, each of the plurality of backlight panels 101 includes: a plurality of first light-emitting units 30a arranged in the body area 20; and a plurality of second light-emitting units 30b arranged in the splicing area 10, wherein the plurality of first light-emitting units 30a and the plurality of second light-emitting units 30b are arranged in a matrix, and under a same area, a brightness of the body area 20 is lower than a brightness of the splicing area 10, so that the brightness of the body area 20 and the splicing area 10 tends to be uniform, thereby alleviating the dark shadow phenomenon of the splicing area of the backlight panel, thus ensuring a good display effect.

Referring to FIG. 1, specifically, in one of the backlight panels 101 in a middle area of the backlight module 100, the splicing area 10 surrounds four sides of the body area 20; in one of the backlight panels 101 in a corner area of the backlight module 100, the splicing area 10 may only surround two sides of the body area 20 (when the backlight panel 101 is adjacent to four corners of the backlight module 100), or only surround 3 sides of the body area 20 (when the backlight board 101 is adjacent to a side of the backlight module 100).

Referring to FIG. 2, FIG. 2 is a schematic top view of a part of the backlight panel 101 according to an embodiment of the present invention. As shown in FIG. 2, in an embodiment of the present invention, an average brightness of the plurality of first light-emitting units 30*a* is lower than 0.1%-20% of an average brightness of the plurality of second light-emitting units 30*b*. Specifically, in a preferred embodiment of the present invention, the average brightness of the plurality of first light-emitting units 30*a* is lower than 1% to 5% of the average brightness of the plurality of second light-emitting units 30*b*.

In fact, a brightness difference between the body area 20 and the splicing area 10 of the backlight panel 101 can be quantitatively obtained by an optical measuring instrument such as CA-410, so as to determine a degree to which the brightness of the first light-emitting unit 30*a* needs to be reduced. The brightness of the first light-emitting unit 30*a* of the body area 20 depends on an actual brightness of the module and its system architecture, as well as a subjective judgment of human eyes on the brightness difference. Generally, a brightness difference per unit area between the body area 20 and the splicing area 10 of the backlight panel 101 ranges between 0.1% and 20%, and a common brightness difference per unit area does not exceed 5%.

In theory, reducing the average brightness of the plurality of first light-emitting units 30*a* will cause a slight decrease in panel brightness, but the actual decrease is small. For example, in a conventional backlight module 100, the splicing area 10 and the body area 20 have a brightness difference of 5%. In the backlight module 100 of the present invention, it is only necessary to reduce the brightness per unit area of the body area 20 by 2% to 3% to weaken the dark shadow phenomenon of the splicing area 10 to an acceptable level. It is not necessary to reduce the brightness difference per unit area to 5%.

It should be noted that although the above embodiments all adopting the method of reducing the brightness per unit area of the body area 20 of the backlight module 100 as a main illustrated technical means, those skilled in the art should understand that in other embodiments of the present invention, to achieve the object that in the backlight module 100, the brightness of the body area 20 is lower than the brightness of the splicing area 10 under the same area, it is also feasible to select the second light-emitting units 30*b* whose an average brightness in the splicing area 10 of the backlight panel 101 is higher than that of the first light-emitting units 30*a* in the body area 20.

In an embodiment of the present invention, the first light-emitting units 30*a* and the second light-emitting units 30*b* may be light-emitting diodes (LED) or chips (DIE/CHIP) of various sizes, which are not particularly limited in the present invention.

Still referring to FIG. 2, in an embodiment of the present invention, the plurality of second light emitting units 30*b* are arranged in at least one row along the splicing area 10 in an extension direction of the splicing seam 10'. However, in other embodiments of the present invention, the plurality of second light-emitting units 30*b* may also be arranged in a plurality of the rows, for example, two rows or three rows, along the splicing area 10 in the extension direction of the splicing seam 10'.

Specifically, counting a number of the rows of the second light-emitting units 30*b* from the edge of each backlight panel 101, the splicing area 10 is provided with at least one row of the second light-emitting units 30*b*. The splicing area 10 is defined by the range of the dark shadows generated on the display screen; and the body area 20 is defined as an area of each of the backlight panels 101 except for the splicing area 10, as shown in FIGS. 1 and 2. A specific range of the splicing area 10 is determined by analyzing actual situations of the backlight panel 101, such as an actual output brightness of the backlight panel 101, designed pitches of the light-emitting units (the first light-emitting units 30*a* and the second light-emitting units 30*b*), a light mixing distance (OD) of the display device, light distribution of the light-emitting units (the first light-emitting units 30*a* and the second light-emitting units 30*b*), a film architecture in the display device, distances from edges of the backlight panel 101 to the light-emitting units (the first light-emitting units 30*a* and the second light-emitting units 30*b*, such as small lamp beads) on the backlight panel 101. The plurality of second light-emitting units 30*b* can be arranged in one row along the splicing area 10 in the extension direction of the splicing seam 10'. However, in other embodiments, in a backlight panel 101 having densely arranged light-emitting units (with a smaller pitch between the light-emitting units), the plurality of second light-emitting units 30*b* may also be arranged in two to three rows along the splicing seam 10' in extension direction of splicing seam 10'.

In other embodiments of the present invention, all technical means which achieve the object that in the backlight module 100, the brightness of the body area 20 is lower than the brightness of the splicing area 10 under the same area can be used, and therefore, it is also feasible to add light-absorbing material (such as carbon powder) into a light-transmissible area (such as lens, an encapsulating glue) around the light-emitting units 30*a* of the body area 20.

Figure 3:
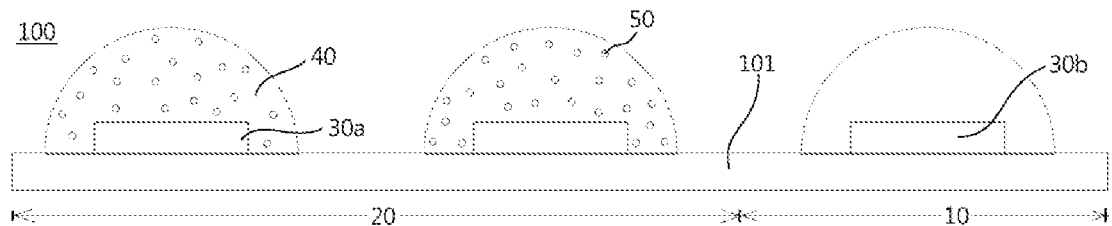
FIG. 3 is a schematic cross-sectional view of the backlight module according to an embodiment of the present invention.

Referring to FIG. 3, FIG. 3 is a schematic cross-sectional view of the backlight module 100 according to an embodiment of the present invention. As shown in FIG. 3, in an embodiment of the present invention, the backlight module 100 further includes a plurality of lenses 40, and the plurality of lenses 40 cover the plurality of first light-emitting units 30*a* in a one-to-one correspondence, wherein the light-absorbing material 50 is dispersed in each of the lenses 40. Specifically, the light-absorbing material 50 can be uniformly dispersed in the lens 40, but in other embodiments, the light-absorbing material 50 can also be concentrated on a light-exiting surface of the lens 40.

Figure 4:
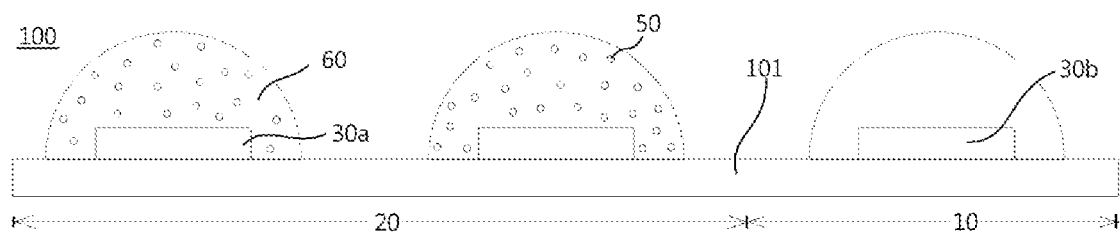
FIG. 4 is a schematic cross-sectional view of the backlight module according to another embodiment of the present invention.

Referring to FIG. 4, FIG. 4 is a schematic cross-sectional view of a backlight module 100 according to another embodiment of the present invention. As shown in FIG. 4, in another embodiment of the present invention, the backlight module 100 may also include an encapsulating glue 60, and the encapsulating glue 60 covers the plurality of first light-emitting units 30*a*, wherein the light-absorbing material 50 is dispersed in the encapsulating glue 60. Similarly, the light-absorbing material 50 can be uniformly dispersed in the encapsulating glue 60. However, in other embodiments, the light-absorbing material 50 can also be concentrated on a light-exiting surface of the encapsulating glue 60.

Figure 5:
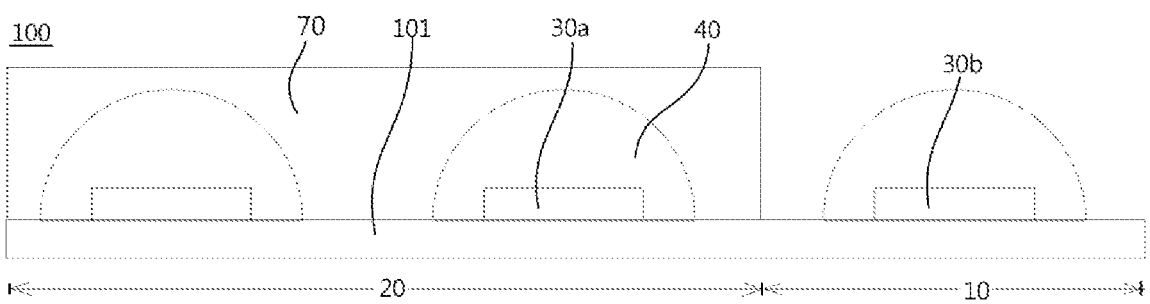
FIG. 5 is a schematic cross-sectional view of the backlight module according to a further embodiment of the present invention.

It should be noted that, referring to FIG. 5, FIG. 5 is a schematic cross-sectional view of the backlight module 100 according to a further embodiment of the present invention.

As shown in FIG. 5, in a further embodiment of the present invention, a light-absorbing layer 70 can directly cover components such as the lens 40 or the encapsulating glue 60, and the light-absorbing layer 70 is configured to absorb, reflect, or scatter part of the light emitted by the first light-emitting units 30a, so as to achieve the purpose that the brightness of the body area 20 is lower than the brightness of the splicing area 10 under the same area, so that the brightness of the body area 20 and the splicing area 10 tends to be uniform, thereby alleviating the dark shadow phenomenon of the splicing area of the backlight panel, thus ensuring a good display effect. Specifically, the light-absorbing layer 70 can be conformal to components such as the lens 40 or the encapsulating glue 60, or blankety cover the lens 40 or the encapsulating glue 60, which are not particularly limited in the present invention, as long as the brightness uniformity of an entire surface of the backlight module 100 is satisfied.

Specifically, in an embodiment of the present invention, the light-absorbing material 50 added to the lens 40 or the encapsulating glue 60 is selected from one or more of carbon powder, toner, graphene, and matte powder; and the light-absorbing material 50 is present in an amount of 0.01%-50%, preferably 0.1%-35%, or 0.1%-10% by weight of each of the lenses 40 or the encapsulating glue 60. It is appreciated that, in an embodiment of the present invention, the addition amount of the light-absorbing material 50 can be controlled so that the average brightness of the plurality of first light-emitting units 30a is lower than 0.1%-20% of the average brightness of the plurality of second light-emitting units 30b.

Figure 6:
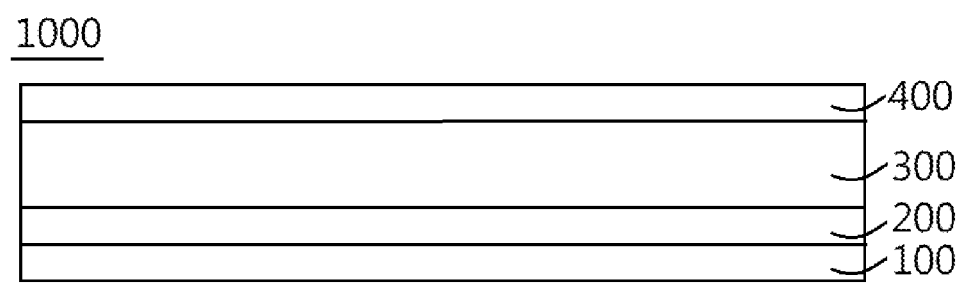
FIG. 6 is a schematic cross-sectional view of a display device according to an embodiment of the present invention.

Referring to FIG. 6, FIG. 6 is a schematic cross-sectional view of a display device according to an embodiment of the present invention. As shown in FIG. 6, another embodiment of the present invention further provides a display device 1000. The display device 1000 includes a backlight module 100, an array substrate 200, a liquid crystal layer 300, and a color filter substrate 400 stacked in sequence, wherein the backlight module is selected from the backlight module 100 according to any one of the above-mentioned embodiments of the present invention.

It is clearly appreciated from the above description that in the backlight module 100 and the display device 1000 adopting the backlight module 100 provided by the present invention, the distance between an edge of backlight panels 101 and light-emitting units (the first light-emitting units 30a and the second light-emitting units 30b, such as small lamps) on the backlight panels 101 is not limited by the problem that the distance from the edge cannot be reduced indefinitely, and therefore an effect of alleviating dark shadows can be further improved without increasing complexity of structures and a manufacturing process of the backlight panels 101, and without shielding the light-emitting units (the first light-emitting units 30a and the second light-emitting units 30b). Rather, in the backlight module 100 and the display device 1000 adopting the backlight module 100 provided by the present invention, only by adding a small amount of material and production cost (selecting light-emitting units with different brightness and/or adding a light-absorbing material), the uneven brightness between two areas, a backlight panel body area and a splicing area, can be improved, thus ensuring a good display effect. Accordingly, in the backlight module 100 and the display device 1000 adopting the backlight module 100 provided by the present invention, by reducing an output brightness of an area (body area 20) other than the splicing area 10 of the backlight panels 101, a dark shadow phenomenon in the splicing area 10 of the backlight panels 101 is improved, and the backlight panels 101 having brightness tending to be visually uniform in the body area and the splicing area 10, thereby achieving the effect of enhancing the viewing taste.

In addition, the features of each embodiment can be combined arbitrarily to form a new embodiment, and all new embodiments formed by the combination fall within the protection scope of the present invention. The described features or characteristics may be combined into one or more embodiments in any other suitable manner. In the above description, some specific details are provided, such as thickness, quantity, etc., in order to provide a comprehensive understanding of the embodiments of the present invention. However, those skilled in the relevant art will understand that the present invention can be implemented without one or more of the above specific details, or it can be implemented by other methods, components, materials, etc.

Although the above examples are used to illustrate the principles of the present invention in one or more applications, for those skilled in the art, without departing from the principles and ideas of the present invention, it is obvious that various modifications can be made in the form, usage, and implementation details without creative work. Therefore, the present invention is defined by the appended claims.

What is claimed is:

1. A backlight module, composed of a plurality of backlight panels spliced with each other, each of the plurality of backlight panels comprising a body area and a splicing area located on a periphery of the body area, the splicing area being defined as an area adjacent to splicing seams between adjacent ones of the plurality of backlight panels; wherein the backlight panel comprises:
    a plurality of first light-emitting units, the plurality of first light-emitting units being arranged in the body area; and
    a plurality of second light-emitting units, wherein the plurality of second light-emitting units being arranged in the splicing area,
    wherein the plurality of first light-emitting units and the plurality of second light-emitting units are arranged in a matrix, and a brightness per unit area of the body area is lower than a brightness per unit area of the splicing area,
    wherein the backlight module further comprises a light-absorbing material, and the light-absorbing material is disposed in the body area,
    wherein the backlight module further comprises an encapsulating glue covering the plurality of first light-emitting units, wherein the light-absorbing material is dispersed in the encapsulating glue.

2. The backlight module according to claim 1, wherein the light-absorbing material is present in an amount of 0.01%-50% by weight of the encapsulating glue.

3. The backlight module according to claim 1, wherein the light-absorbing material is selected from one or more of carbon powder, toner, graphene, and matte powder.

4. The backlight module according to claim 1, wherein the plurality of second light-emitting units are arranged in at least one row along the splicing area in an extension direction of the splicing seams.

5. The backlight module according to claim 1, wherein the plurality of second light-emitting units are arranged in a plurality of rows along the splicing area in an extension direction of the splicing seams.

6. The backlight module according to claim 1, wherein a brightness of each of the first light-emitting units is lower than 0.1%-20% of a brightness of each of the second light-emitting units.

7. The backlight module according to claim 1, wherein the backlight module further comprises a light-absorbing material, and the light-absorbing material is disposed in the body area.

8. A display device, wherein the display device comprises a backlight module, and the backlight module is composed of a plurality of backlight panels spliced with each other, each of the plurality of backlight panels comprising a body area and a splicing area located on a periphery of the body area, the splicing area being defined as an area adjacent to splicing seams between adjacent ones of the plurality of backlight panels; wherein the backlight panel comprises:
- a plurality of first light-emitting units, the plurality of first light-emitting units being arranged in the body area; and
- a plurality of second light-emitting units, wherein the plurality of second light-emitting units being arranged in the splicing area,
- wherein the plurality of first light-emitting units and the plurality of second light-emitting units are arranged in a matrix, and in each of the backlight panels, a brightness per unit area of the body area is lower than a brightness per unit area of the splicing area,
- wherein the splicing areas of adjacent ones of the plurality of backlight panels meet at the splicing seams, and no reflective sheet overlapping the splicing seam in a direction perpendicular to an upper surface of the backlight panel is provided in backlight module,
- wherein the backlight module further comprises a light-absorbing material, and the light-absorbing material is disposed in the body area, and
- wherein the backlight module further comprises an encapsulating glue covering the plurality of first light-emitting units, wherein the light-absorbing material is dispersed in the encapsulating glue.

9. The display device according to claim 8, wherein a brightness of each of the first light-emitting units is lower than 0.1%-20% of a brightness of each of the second light-emitting units.

10. The display device according to claim 8, wherein a brightness of each of the first light-emitting units is lower than 1%-5% of a brightness of each of the second light-emitting units.

11. The display device according to claim 8, wherein the light-absorbing material is present in an amount of 0.01%-50% by weight of the encapsulating glue.

12. The display device according to claim 8, wherein the light-absorbing material is selected from one or more of carbon powder, toner, graphene, and matte powder.

13. The display device according to claim 8, wherein the plurality of second light-emitting units are arranged in at least one row along the splicing area in an extension direction of the splicing seams.

14. The display device according to claim 8, wherein the plurality of second light-emitting units are arranged in a plurality of rows along the splicing area in an extension direction of the splicing seams.

* * * * *